US012293014B2

(12) United States Patent
Nishio et al.

(10) Patent No.: US 12,293,014 B2
(45) Date of Patent: May 6, 2025

(54) INFORMATION PROCESSING APPARATUS AND CONTROL METHOD

(71) Applicant: Lenovo (Singapore) Pte. Ltd., Singapore (SG)

(72) Inventors: Masashi Nishio, Kanagawa (JP); Yuji Wada, Kanagawa (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 18/495,007

(22) Filed: Oct. 26, 2023

(65) Prior Publication Data

US 2024/0201780 A1 Jun. 20, 2024

(30) Foreign Application Priority Data

Dec. 14, 2022 (JP) ................................. 2022-199224

(51) Int. Cl.
*G06F 3/01* (2006.01)
*G06V 40/16* (2022.01)

(52) U.S. Cl.
CPC ............ *G06F 3/012* (2013.01); *G06V 40/161* (2022.01); *G09G 2320/0252* (2013.01);
(Continued)

(58) Field of Classification Search
CPC ............ G06F 3/012; G06F 2320/0626; G06F 2330/023; G06F 1/3231; G06F 1/3265;
(Continued)

(56) References Cited

U.S. PATENT DOCUMENTS 7,379,560 B2 * 5/2008 Bradski ................. G06F 1/3231
382/103
2011/0228117 A1 * 9/2011 Inoue .................... G06V 40/161
348/222.1

(Continued)

FOREIGN PATENT DOCUMENTS

JP 2001-350549 A 12/2001
JP 2013-109430 A 6/2013
(Continued)

OTHER PUBLICATIONS

Extended European Search Report issued in related European Patent Application No. 23203225.0, dated Jan. 26, 2024 (10 pages).

*Primary Examiner* — Xuemei Zheng
(74) *Attorney, Agent, or Firm* — Osha Bergman Watanabe & Burton LLP

(57) ABSTRACT

An information processing apparatus includes a processor that processes the image data of the image stored in a memory in order to detect a face area with a face captured therein and an orientation of the face from the image, and controls the screen brightness of a display unit based on the orientation of the face detected by the processing. When the detected face orientation falls within a preset first angle range, the processor determines that the face orientation is a first orientation, and even when the detected face orientation is out of the first angle range, the processor determines that the face orientation is the first orientation depending on the amount of change in the detected orientation of the face changing in a direction of the first orientation.

9 Claims, 7 Drawing Sheets

SIDEWAYS

SCREEN BRIGHTNESS: LOW BRIGHTNESS

(52) U.S. Cl.
CPC .............. *G09G 2320/0626* (2013.01); *G09G 2330/023* (2013.01); *G09G 2354/00* (2013.01)

(58) Field of Classification Search
CPC .... G06V 40/161; G06V 40/16; G06V 40/165; G06V 40/166; G06V 20/597; G06V 40/171; G06V 40/10; G06V 40/168; G06V 40/20; G06V 40/45; G06V 20/52; G06V 10/10; G06V 10/141; G09G 2320/0252; G09G 2320/0626
See application file for complete search history.

(56) References Cited

U.S. PATENT DOCUMENTS

| | | | |
|---|---|---|---|
| 2021/0096632 A1 | 4/2021 | Kosugi et al. | |
| 2021/0149441 A1* | 5/2021 | Bartscherer | G06F 1/1616 |
| 2021/0281743 A1* | 9/2021 | Tadano | G06V 40/165 |
| 2022/0382359 A1 | 12/2022 | Kosugi | |
| 2023/0359468 A1* | 11/2023 | Sivagnanenthirarajah | G06F 9/54 |

FOREIGN PATENT DOCUMENTS

| | | |
|---|---|---|
| JP | 2014-056312 A | 3/2014 |
| JP | 2014-099205 A | 5/2014 |
| JP | 2015-153293 A | 8/2015 |
| JP | 2016148895 A | 8/2016 |
| JP | 2016-178348 A | 10/2016 |
| JP | 2017-167756 A | 9/2017 |

\* cited by examiner

INFORMATION PROCESSING APPARATUS AND CONTROL METHOD

CROSS-REFERENCE TO RELATED APPLICATIONS

This application claims priority to Japanese Patent Application No. 2022-199224 filed on Dec. 14, 2022, the contents of which are hereby incorporated herein by reference in their entirety.

BACKGROUND

Technical Field

The present invention relates to an information processing apparatus and a control method.

Description of Related Art

There is an apparatus which makes a transition to a usable state when a person approaches or to a standby state in which functions except some of the functions are stopped when the person leaves. For example, in Japanese Unexamined Patent Application Publication No. 2016-148895, it is detected whether a person is approaching or has moved away using an infrared sensor.

In recent years, with the development of computer vision and the like, detection accuracy when detecting a face from an image has been getting higher. Therefore, person detection by face detection is also performed instead of person detection by the infrared sensor. In the person detection by face detection, since the orientation of a face can be detected in addition to simply detecting a person, control according to the orientation of the face (facing forward, facing sideways, or the like) can also be performed. For example, when the face is not facing forward (in the direction of the apparatus), the screen brightness of a display unit is also reduced to save power.

For example, in a case where the screen brightness is reduced when the face is not facing forward (for example, facing sideways), it is desired to restore the screen brightness when the face turns forward again. However, when the face turns forward from sideways, since it takes time (for example, about one second) to detect that the face turns forward, responsiveness from the time when the face turns forward until the standard brightness is restored is poor. Therefore, it is difficult to perform positive control of reducing the screen brightness depending on this face orientation, and it may not be able to fully contribute to power saving.

SUMMARY

The present invention has been made in view of the above circumstances, and it is an object thereof to provide an information processing apparatus and a control method which improve responsiveness when detecting a face orientation to control the screen brightness of a display unit.

The present invention has been made to solve the above problem, and an information processing apparatus according to the first aspect of the present invention includes: a memory which temporarily stores image data of an image captured by an imaging unit; and a processor which processes the image data stored in the memory, the processor performing face detection processing to process the image data of the image stored in the memory in order to detect a face area with a face captured therein and an orientation of the face from the image, and brightness control processing to control the screen brightness of a display unit based on the orientation of the face detected by the face detection processing, wherein in the face detection processing, when the detected face orientation falls within a preset first angle range, the processor determines that the face orientation is a first orientation, and even when the detected face orientation is out of the first angle range, the processor determines that the face orientation is the first orientation depending on the amount of change in the detected orientation of the face changing in a direction of the first orientation.

The above information processing apparatus may also be such that, in the face detection processing, when the detected face orientation changes by a predetermined angle or more from a second orientation outside the first angle range in the direction of the first orientation even though the detected face orientation is out of the first angle range, the processor determines that the face orientation is the first orientation.

The above information processing apparatus may further be such that, in the face detection processing, when the detected face orientation changes by the predetermined angle or more from the second orientation in the direction of the first orientation within a predetermined time even though the detected face orientation is out of the first angle range, the processor determines that the face orientation is the first orientation.

Further, the above information processing apparatus may be such that, in the face detection processing, the processor performs processing to determine whether or not the face orientation is the first orientation within a second angle range wider than the first angle range, and based on the amount of change of the face orientation in the direction of the first orientation outside the first angle range within the second angle range, the processor performs the processing to determine whether or not the face orientation is the first orientation.

Further, the above information processing apparatus may be such that, in the face detection processing, the processor reduces a detection cycle when the detected face orientation is within the first angle range to less than the detection cycle when the detected face orientation is out of the first angle range.

Further, the information processing apparatus may be such that, in the face detection processing, the processor reduces the detection cycle when the detected face orientation is within the first angle range to less than the detection cycle when the detected face orientation is out of the first angle range within the second angle range.

Further, the above information processing apparatus may be such that, in the brightness control processing, when the face orientation detected by the face detection processing changes from within the first angle range to outside the first angle range, the processor reduces the screen brightness.

Further, the above information processing apparatus may be such that, in the brightness control processing, when the face orientation detected by the face detection processing is determined to be the first orientation in such a state that the screen brightness is being reduced, the processor restores the screen brightness before being reduced.

Further, the above information processing apparatus may be such that the imaging unit outputs the image data of the image obtained by imaging a predetermined angle of view in a direction to face a screen of the display unit.

A control method according to the second aspect of the present invention is a control method for an information processing apparatus including: a memory which temporarily stores image data of an image captured by an imaging unit; and a processor which processes the image data stored in the memory, the control method including: a face detection step of causing the processor to process the image data of the image stored in the memory in order to detect a face area with a face captured therein and an orientation of the face from the image; and a brightness control step of causing the processor to control the screen brightness of a display unit based on the orientation of the face detected in the face detection step, wherein in the face detection step, when the detected face orientation falls within a preset first angle range, the face orientation is determined to be a first orientation, and even when the detected face orientation is out of the first angle range, the face orientation is determined to be the first orientation depending on the amount of change of the detected orientation of the face changing in a direction of the first orientation.

The above-described aspects of the present invention can improve responsiveness when detecting the face orientation to control the screen brightness of the display unit.

DETAILED DESCRIPTION

An embodiment of the present invention will be described below with reference to the accompanying drawings.

[Outline]

First, the outline of an information processing apparatus according to the embodiment will be described.

Figure 1:
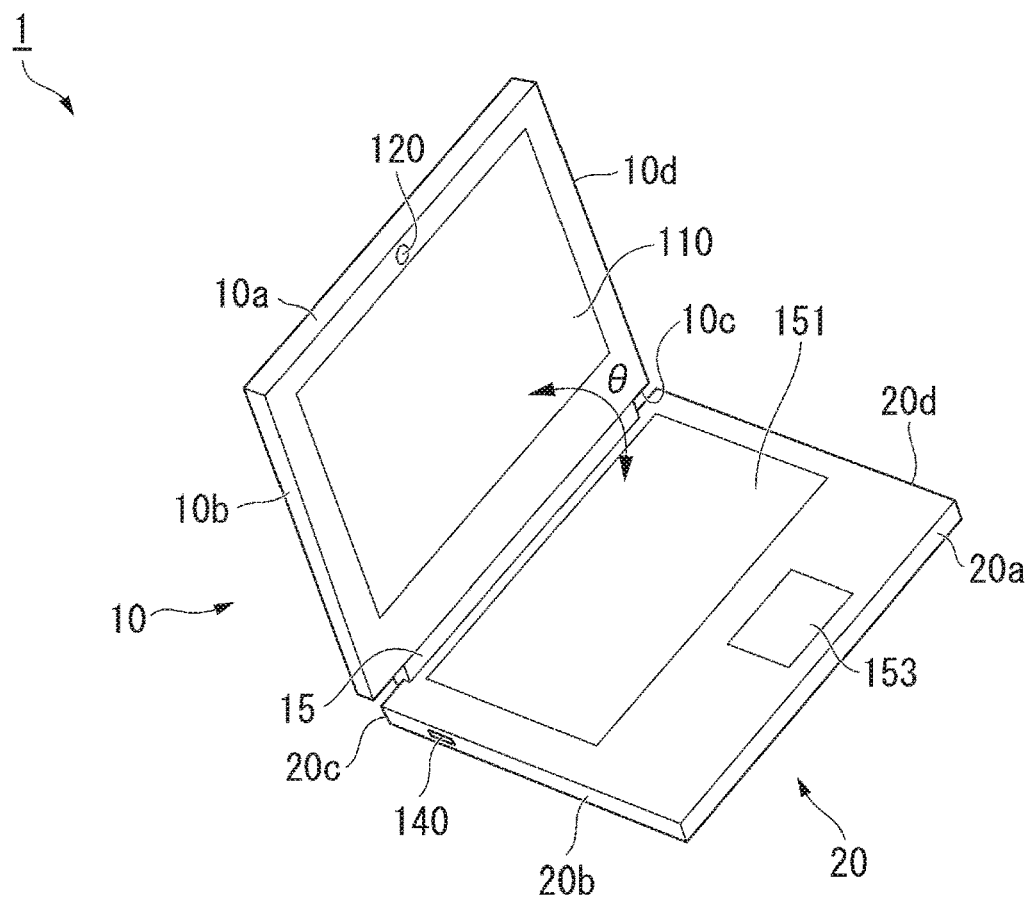
FIG. 1 is a perspective view illustrating a configuration example of the appearance of an information processing apparatus according to an embodiment.

FIG. 1 is a perspective view illustrating a configuration example of the appearance of an information processing apparatus 1 according to the present embodiment.

The information processing apparatus 1 is, for example, a laptop (clamshell type) PC (Personal Computer). The information processing apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. An open angle by the rotation between the first chassis 10 and the second chassis 20 is denoted by "θ" in FIG. 1.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the information processing apparatus 1 in FIG. 1 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when a user uses the information processing apparatus 1, and the information processing apparatus 1 is often used in a state where the open angle is typically about θ=100° to 130°. Note that the range of open angles θ to be the open state can be set arbitrarily according to the range of angles rotatable by the hinge mechanism 15, or the like.

A display unit 110 is provided on the inner face of the first chassis 10. The display unit 110 is configured to include liquid crystal display (LCD) or an organic EL (Electro Luminescence) display, and the like. Further, an imaging unit 120 is provided in a peripheral area of the display unit 110 on the inner face of the first chassis 10. For example, the imaging unit 120 is arranged on the side of the side face 10a in the peripheral area of the display unit 110. Note that the position at which the imaging unit 120 is arranged is just an example, and it may be elsewhere as long as the imaging unit 120 can face a direction to face a display screen of the display unit 110.

In the open state, the imaging unit 120 images a predetermined imaging range to face the display screen of the display unit 110 (that is, in front of the information processing apparatus 1). The predetermined imaging range is a range of angles of view defined by an image sensor included in the imaging unit 120 and an optical lens provided in front of the imaging surface of the image sensor. For example, the imaging unit 120 can capture an image including a person (user) present in front of the information processing apparatus 1.

Further, a power button 140 is provided on the side face 20b of the second chassis 20. The power button 140 is an operating element used by the user to give an instruction to power on or power off, make a transition from a standby state to a normal operating state, make a transition from the normal operating state to the standby state, or the like. The normal operating state is an operating state of a system capable of executing processing without being particularly limited, which corresponds, for example, to S0 state defined in the ACPI (Advanced Configuration and Power Interface) specification.

The standby state is a state in which at least part of system processing is limited and power consumption is lower than that in the normal operating state. For example, the standby state may be the standby state or a sleep state, modern standby in Windows (registered trademark), or a state corresponding to S3 state (sleep state) defined in the ACPI specification. Further, a state in which at least the display of the display unit appears to be OFF (screen OFF), or a screen lock state may also be included as the standby state. The screen lock is a state in which an image preset to make a content being processed invisible (for example, an image for the screen lock) is displayed on the display unit, that is, an unusable state until the lock is released (for example, until the user is authenticated).

Further, a keyboard 151 and a touch pad 153 are provided on the inner face of the second chassis 20 as an input device to accept user operation input. Note that a touch sensor may also be provided as the input device instead of or in addition to the keyboard 151 and the touch pad 153, or a mouse and an external keyboard may be connected. When the touch sensor is provided, an area corresponding to the display surface of the display unit 110 may be constructed as a touch panel to accept operations. Further, a microphone used to input voice may be included in the input device.

Note that in the closed state where the first chassis 10 and the second chassis 20 are closed, the display unit 110 and the imaging unit 120 provided on the inner face of the first chassis 10, and the keyboard 151 and the touch pad 153 provided on the inner face of the second chassis 20 are covered with each other's chassis faces, respectively, and put in a state of being disabled from fulfilling the functions.

The information processing apparatus 1 executes HPD (Human Presence Detection) processing to detect a person present in front of the information processing apparatus 1 based on a captured image captured by the imaging unit 120.

Figure 2:
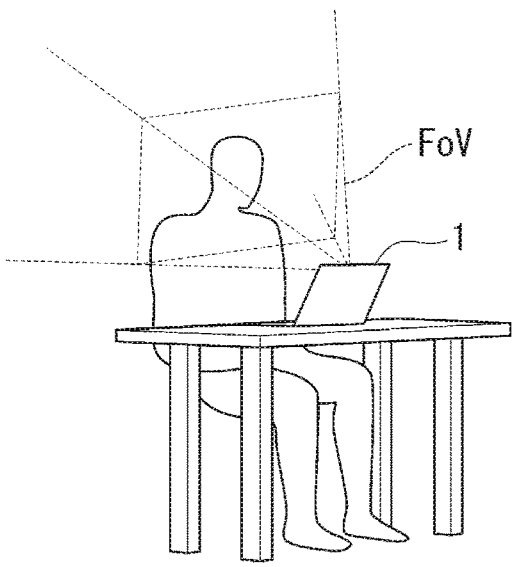
FIG. 2 is a diagram illustrating an example of a person detection range of the information processing apparatus according to the embodiment.

FIG. 2 is a diagram illustrating an example of a person detection range of the information processing apparatus 1 according to the present embodiment. In the illustrated example, a detection range FoV (Field of View: detection viewing angle) in front of the information processing apparatus 1 is a person-detectable range.

For example, the information processing apparatus 1 detects a face area with a face captured therein from a captured image captured by the imaging unit 120 to determine whether or not a person (user) is present in front of the information processing apparatus 1. The detection range FoV corresponds to an angle of view at which the information processing apparatus 1 captures images. When the face area is detected from the captured image, the information processing apparatus 1 determines that the person (user) is present. On the other hand, when any face area is not detected from the captured image, the information processing apparatus 1 determines that no person (user) is present.

The information processing apparatus 1 controls the operating state of the system of the information processing apparatus 1 depending on the presence or absence of the person (user) by the HPD processing. For example, when the person (user) is present in front of the information processing apparatus 1, the information processing apparatus 1 controls the operating state to the normal operating state, while when no person (user) is present in front of the information processing apparatus 1, the information processing apparatus 1 controls the operating state to the standby state.

Further, when the person (user) is present in front of the information processing apparatus 1, the information processing apparatus 1 detects the orientation of a face of the person (user). For example, the information processing apparatus 1 determines whether or not the face of the person (user) is facing the direction of the information processing apparatus 1 (the direction of the display unit 110 and the imaging unit 120). The orientation of the face here is an orientation corresponding to the rotation angle of the face to the left and right. In the following, a state where the face is facing the direction of the information processing apparatus 1 (the direction of the display unit 110 and the imaging unit 120) is assumed to be a state where the face is facing forward. Further, a state where the face is facing to the right or left with respect to the front is assumed to be a state where the face is facing sideways.

For example, the information processing apparatus 1 controls the screen brightness of the display unit 110 (dimming control) according to whether or not the orientation of the face of the person (user) is forward. Specifically, when the face is not facing forward (for example, when the face turns sideways), the information processing apparatus 1 reduces the screen brightness of the display unit 110 to save power. Further, when the face turns forward again, the information processing apparatus 1 restores the original screen brightness before being reduced.

In the following, the original screen brightness before being reduced is called "standard brightness." Further, the screen brightness reduced from the standard brightness when the face is not facing forward (for example, when the face turns sideways) is called "low brightness." The low brightness is a brightness lower than at least the standard brightness. The lower the brightness, the more power will be saved. For example, the low brightness may be a brightness of about 0 to 10% of the standard brightness.

Here, when the face turns forward from sideways, it takes time (for example, about one second) to detect that the face turns forward by face detection processing. Therefore, when the information processing apparatus 1 performs control to restore the standard brightness after detecting that the face turns forward, there is a delay from the time when the face turns forward until the standard brightness is restored, resulting in poor responsiveness. Therefore, the information processing apparatus 1 detects a change in the orientation of the face from sideways toward the front to predict that the face will turn forward, and performs control to restore the standard brightness before the face turns directly forward.

Figure 3:
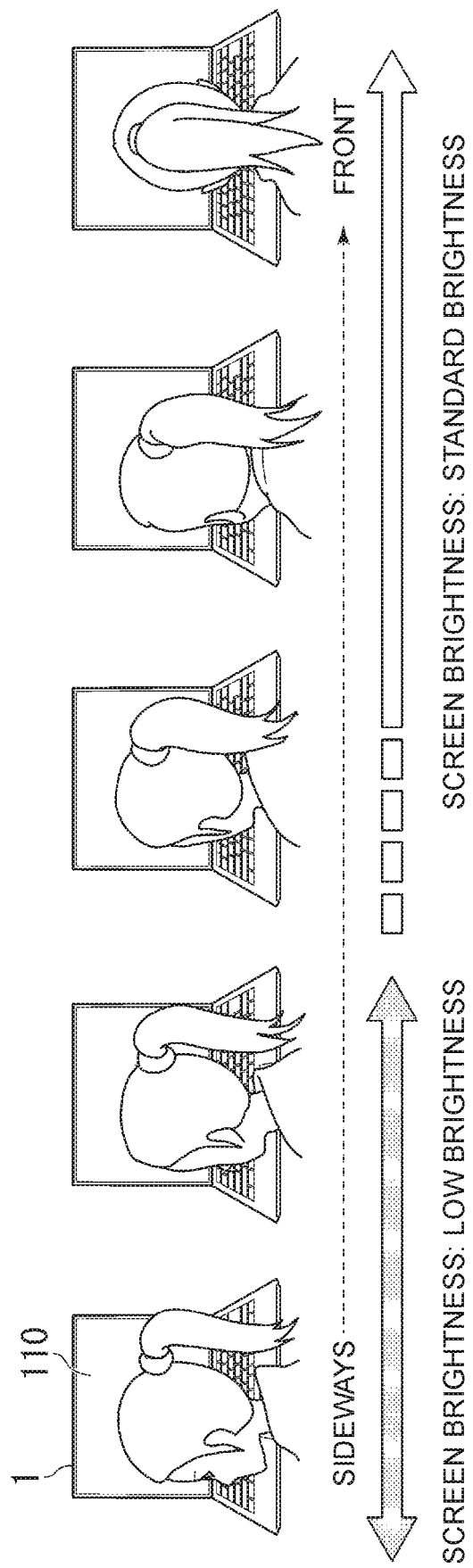
FIGS. 3A-3E are schematic diagrams for describing screen brightness control depending on a face orientation according to the embodiment.

FIGS. 3A-3E are schematic diagrams for describing screen brightness control depending on the face orientation according to the present embodiment. FIGS. 3A-3E illustrate screen brightness control when the face of a person (user) in front of the information processing apparatus 1 turns forward from sideways. FIG. 3A illustrates a state where the face is facing sideways. Then, the orientation of the face changes toward the front gradually in order of FIGS. 3B, 3C, and 3D, and 3E illustrates a state where the face turns directly forward.

In the state where the face is facing sideways as illustrated at (A), the screen brightness is being controlled to the low brightness. Then, based on the fact that the orientation of the face changes from the sideways orientation illustrated at (A) toward the front as illustrated at (B), the information processing apparatus 1 determines the face orientation as if the face turned forward, and performs control to switch the screen brightness to the standard brightness after (C) and before (E). Thus, although the screen brightness is being controlled to the low brightness at (A) and (B), the screen brightness is switched to the standard brightness before the face turns directly forward as the face orientation changes from sideways toward the front.

For example, the information processing apparatus 1 determines whether or not the face turns forward depending on the amount of change in the orientation of the face changing toward the front. Specifically, when the orientation of the face changes toward the front by a predetermined angle or more (for example, 10° or more) within a predetermined time (for example, within one second), the information processing apparatus 1 determines the face orientation as if the face turned forward. Thus, the information processing apparatus 1 can perform control to switch to the standard brightness before the face turns directly forward, and hence responsiveness can be improved.

The configuration of the information processing apparatus 1 according to the present embodiment will be described in detail below.

[Hardware Configuration of Information Processing Apparatus]

Figure 4:
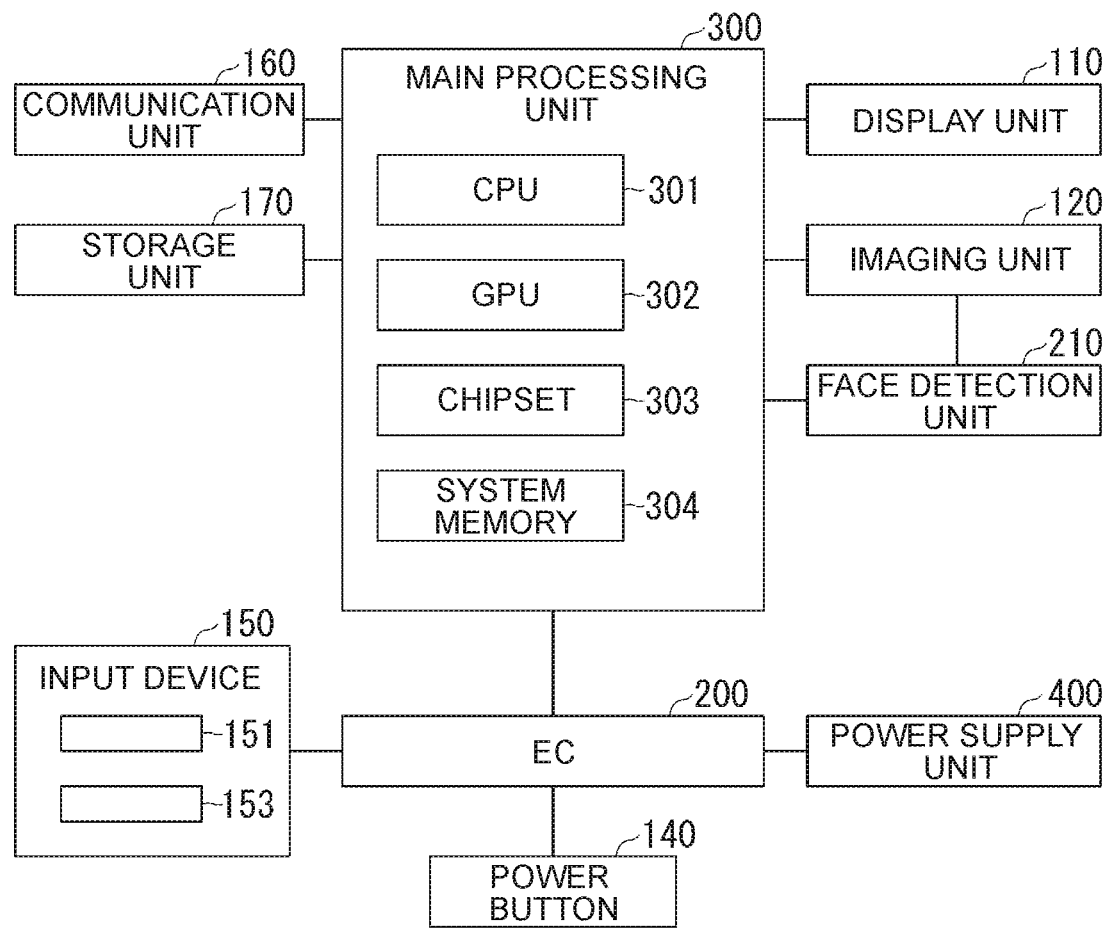
FIG. 4 is a schematic block diagram illustrating an example of the hardware configuration of the information processing apparatus according to the embodiment.

FIG. 4 is a schematic block diagram illustrating an example of the hardware configuration of the information processing apparatus 1 according to the present embodiment. In FIG. 4, components corresponding to respective units in FIG. 1 are given the same reference numerals. The information processing apparatus 1 is configured to include the display unit 110, the imaging unit 120, the power button 140, an input device 150, a communication unit 160, a storage unit 170, an EC (Embedded Controller) 200, a face detection unit 210, a main processing unit 300, and a power supply unit 400.

The display unit 110 displays display data (images) generated based on system processing executed by the main processing unit 300, processing of an application program running on the system processing, and the like.

The imaging unit 120 captures an image of an object within the predetermined imaging range (angle of view) in the direction (frontward) to face the inner face of the first chassis 10, and outputs the captured image to the main processing unit 300 and the face detection unit 210. For example, the imaging unit 120 includes a visible light camera (RGB camera) for capturing an image using visible light and an infrared camera (IR camera) for capturing an image using infrared light.

Note that the imaging unit 120 may be configured to include either one of the visible light camera and the infrared camera, or may be configured to include both the visible light camera and the infrared camera.

The power button 140 outputs, to the EC 200, an operation signal according to a user operation. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of operation contents.

The communication unit 160 is connected to other devices communicably through a wireless or wired communication network to transmit and receive various data. For example, the communication unit 160 is configured to include a wired LAN interface such as Ethernet (registered trademark), a wireless LAN interface such as Wi-Fi (registered trademark), and the like.

The storage unit 170 is configured to include storage media, such as an HDD (Hard Disk Drive) or an SDD (Solid State Drive), a RAM, and a ROM. The storage unit 170 stores an OS, device drivers, various programs such as applications, and various data acquired by the operation of the programs.

The power supply unit 400 supplies power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery (battery pack), to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the functionality. The EC 200 operates independently of the main system processing unit 300 to control the operation of the main processing unit 300 and manage the operating state of the main processing unit 300. Further, the EC 200 is connected to the power button 140, the input device 150, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1. Further, the EC 200 acquires operation signals from the power button 140 and the input device 150, and outputs, to the main processing unit 300, an operation signal related to processing of the main processing unit 300 among the acquired operation signals.

The face detection unit 210 is configured to include a processor for processing image data of a captured image captured by the imaging unit 120. The face detection unit 210 acquires the image data of the captured image captured by the imaging unit 120, and temporarily stores the acquired image data in a memory. The memory in which the image data is stored may be a system memory 304, or an unillustrated memory in the face detection unit 210.

For example, the face detection unit 210 processes the image data of the captured image acquired from the imaging unit 120 to perform face detection processing for detecting a face area from the captured image, detecting the orientation of a face of a face image in the detected face area, and the like. As the face detection method, the face detection unit 210 can apply any detection method using a face detection algorithm for detecting a face based on facial feature information, trained data (learned model) subjected to machine learning based on the facial feature information, a face detection library, or the like.

Further, in the face detection processing, the face detection unit 210 performs face direction determination processing to determine whether or not the face is facing forward as described with reference to FIGS. 3A-3E. The face detection unit 210 determines whether or not the face is facing forward based on the face orientation detected from the captured image, and transmits the determination result to the main processing unit 300. Further, the face detection unit 210 controls the detection frame rate when performing the face detection processing.

The main processing unit 300 is configured to include a CPU (Central Processing Unit) 301, a GPU (Graphic Processing Unit) 302, a chipset 303, and the system memory 304, where processing of various application programs is executable on the OS (Operating System) by system processing based on the OS.

The CPU 301 is a processor which executes processing based on a BIOS program, processing based on the OS program, processing based on application programs running on the OS, and the like. For example, the CPU 301 executes boot processing to boot the system from the standby state and make the transition to the normal operating state, sleep processing to make the transition from the normal operating state to the standby state, and the like. Further, the CPU 301 executes screen brightness control processing to control the screen brightness of the display unit 110 based on the result of the above-described face detection processing by the face detection unit 210.

The GPU 302 is connected to the display unit 110. The GPU 302 executes image processing under the control of the CPU 301 to generate display data. The GPU 302 outputs the generated display data to the display unit 110.

The chipset 303 has a function as a memory controller, a function as an I/O controller, and the like. For example, the chipset 303 controls reading data from and writing data to the system memory 304, the storage unit 170, and the like by the CPU 301 and the GPU 302. Further, the chipset 303 controls input/output of data from the communication unit 160, the display unit 110, and the EC 200. Further, the chipset 303 has a function as a sensor hub. For example, the chipset 303 acquires the detection result by the face detection processing acquired from the face detection unit 210, and outputs the detection result to the CPU 301.

The system memory 304 is used as a reading area of a program executed by the CPU 301 and a working area to write processed data. Further, the system memory 304 temporarily stores image data of a captured image captured by the imaging unit 120.

Note that the CPU 301, the GPU 302, and the chipset 303 may be integrated as one processor, or some or each of them may be configured as an individual processor, respectively. For example, in the normal operating state, the CPU 301, the GPU 302, and the chipset 303 are all operating, but in the standby state, only at least some of the functions of the chipset 303 are operating.

[Functional Configuration of Information Processing Apparatus]

Next, the functional configuration of the information processing apparatus 1 to control the screen brightness depending on the face orientation will be described in detail.

Figure 5:
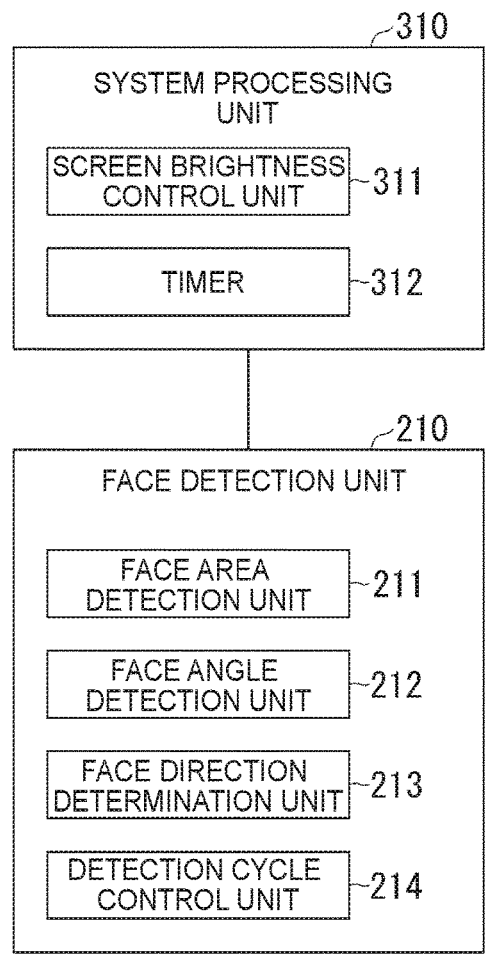
FIG. 5 is a schematic block diagram illustrating an example of the functional configuration of the information processing apparatus according to the embodiment.

FIG. 5 is a schematic block diagram illustrating an example of the functional configuration of the information processing apparatus 1 according to the present embodiment. The information processing apparatus 1 includes the face detection unit 210 and a system processing unit 310. The face detection unit 210 corresponds to the face detection unit 210 in FIG. 4, and includes a face area detection unit 211, a face angle detection unit 212, a face direction determination unit 213, and a detection cycle control unit 214 as functional components to perform the face detection processing.

The face area detection unit 211 processes image data of a captured image acquired from the imaging unit 120 to detect a face area with a face captured therein from the captured image.

The face angle detection unit 212 detects the orientation of the face (face angle) captured in the face area detected from the captured image by the face area detection unit 211. For example, the face angle detection unit 212 detects the face angle in a range of ±90° on the assumption that the face angle when the face is facing forward is 0°. Based on the face angle detected by the face angle detection unit 212, the face direction determination unit 213 determines whether or not the face is facing forward.

Figure 6:
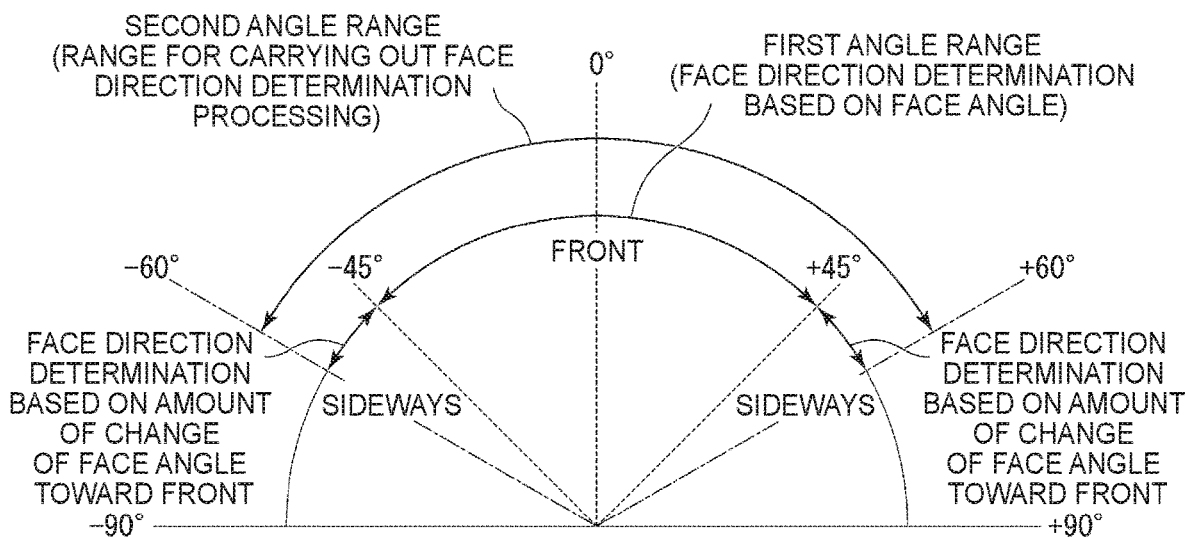
FIG. 6 is a diagram illustrating an example of face angles used in face direction determination processing according to the embodiment.

FIG. 6 is a diagram illustrating an example of face angles used in face direction determination processing according to the present embodiment. In FIG. 6, when the face angle is 0°, the face is facing directly forward, while when the face angle is +90° or −90°, the face is facing directly sideways. For example, the face angle detection unit 212 detects a face angle within the range of ±90°. This is because it is difficult to capture facial feature points in a state where the face angle falls out of the range of ±90°, and hence a face area cannot be detected correctly.

Based on the face angle detected by the face angle detection unit 212, the face direction determination unit 213 performs face direction determination processing within a second angle range (for example, a range of ±60°) to determine whether or not the face is facing forward, and not perform the face direction determination processing outside the second angle range (for example, the range of ±60°). For example, the face direction determination unit 213 determines that the face is facing forward when the face angle detected by the face angle detection unit 212 falls within a first angle range (for example, a range of ±45°) in the second angle range. Therefore, when the face angle detected by the face angle detection unit 212 falls out of the first angle range (for example, the range of ±45°) within the second angle range, the face direction determination unit 213 determines that the face is not facing forward (that is, that the face is facing sideways).

Further, even when the face angle detected by the face angle detection unit 212 is out of the first angle range (for example, the range of ±45°) (that is, facing sideways), the face direction determination unit 213 may determine that the face is facing forward (as if the face turned forward) depending on the amount of change in the detected orientation of the face changing from sideways toward the front. Specifically, when the face angle changes toward the front by a predetermined angle or more (for example, 10° or more) within a predetermined time (for example, within one second), the information processing apparatus 1 determines the face orientation as if the face turned forward, and sets the face angle to 0°.

Thus, the face direction determination unit 213 performs the above-described face direction determination processing in the second angle range (for example, the range of ±60°) wider than the first angle range (for example, the range of ±45°) within which it is determined that the face is facing forward based on the face angle. In ranges outside the first angle range (for example, a range of "+45° to +60°" and a range of "−45° to −60°") within the second angle range, the face direction determination unit 213 performs the face direction determination processing to determine whether or not the face is facing forward depending on the amount of change in the orientation of the face changing from sideways toward the front.

Further, when determining that the face is facing forward (that the face turns forward), the face direction determination unit 213 outputs, to the system processing unit 310, "Attention" information as information indicating such a state that the person (user) is looking at (paying attention to) the information processing apparatus 1. On the other hand, when determining that the face is not facing forward, the face direction determination unit 213 outputs, to the system processing unit 310, "No Attention" information as information indicating such a state that the person (user) is not looking at (not paying attention to) the information processing apparatus 1.

Returning to the description of FIG. 5, the detection cycle control unit 214 controls the detection frame rate (detection cycle) in the face detection processing based on the face angle detected by the face angle detection unit 212. For example, the detection cycle control unit 214 reduces the detection frame rate when the face angle is within the first angle range (for example, the range of ±45°) to less than the detection frame rate when the face angle is out of the first angle range (for example, the range of ±45°). More specifically, the detection cycle control unit 214 reduces the detection frame rate when the face angle is within the first angle range (for example, the range of ±45°) to less than the detection frame rate when the face angle is out of the first angle range (for example, the range of ±45°) within the second angle range (for example, the range of ±60°). Thus, when the face angle is within the first angle range (for example, the range of ±45°) (that is, when the face is facing forward), an increase in power consumption when the user is using the information processing apparatus 1 can be suppressed.

On the other hand, in the case where the screen brightness is being set to the low brightness, when the face angle is out of the first angle range (for example, the range of ±45°) but within the second angle range (for example, the range of ±60°), the detection frame rate is increased to enable switching to the standard brightness immediately when the face turns forward. In this case, although power consumption increases by increasing the detection frame rate, since the screen brightness is being controlled to the low brightness, total power consumption can be reduced.

As an example, when the face angle is within the range of ±45°, the detection cycle control unit 214 reduces the detection frame rate to "one fps," while when the face angle is within a range of ±45° to ±60°, the detection cycle control unit 214 increases the detection frame rate to "15 fps." Note that when the face angle is in a range of ±60° or more, since the face direction determination processing is not performed, the detection cycle control unit 214 controls the detection frame rate to "one fps" because there is no need to increase the detection frame rate.

In the following, a mode to perform the face detection processing at a high detection frame rate (for example, 15 fps) is called an "HP (High Power) mode" and a mode to perform the face detection processing at a low detection frame rate (for example, one fps) is called an "LP (Low Power) mode."

The system processing unit 310 is a functional component implemented by the CPU 301 executing programs of the BIOS and the OS. For example, the system processing unit 310 includes a screen brightness control unit 311 and a timer 312 as functional components implemented by executing the OS program.

The screen brightness control unit 311 controls the screen brightness of the display unit 110 based on the face orientation detected by the face detection unit 210. For example, when acquiring the "No Attention" information from the face detection unit 210 in the normal operating state, the screen brightness control unit 311 controls the screen brightness to the low brightness. In other words, when the face orientation detected by the face detection unit 210 changes from within the first angle range (for example, the range of ±45°) to outside the first angle range, the screen brightness control unit 311 reduces the screen brightness.

Further, when acquiring the "Attention" information from the face detection unit 210 in such a state that the screen brightness is being controlled to the low brightness, the screen brightness control unit 311 restores the screen brightness to the standard brightness. In other words, when determining that the face orientation detected by the face detection unit 210 is toward the front in the state where the screen brightness is being reduced, the screen brightness control unit 311 restores the screen brightness to the standard brightness before the screen brightness is reduced.

The timer 312 is a timer for measuring a waiting time from the time when the "No Attention" information is acquired from the face detection unit 210 in the normal operating state until the screen brightness is controlled to the low brightness. When acquiring the "Attention" information before a predetermined waiting time elapses after the "No Attention" information is acquired, the screen brightness control unit 311 keeps the standard brightness without controlling the screen brightness to the low brightness. When not acquiring the "Attention" information during the predetermined waiting time after the "No Attention" information is acquired, the screen brightness control unit 311 controls the screen brightness to the low brightness. This makes it possible to prevent the screen brightness from being controlled to the low brightness when the user just looks away a little bit during using the information processing apparatus 1. The predetermined waiting time is preset, for example, to 10 seconds. Note that this predetermined waiting time may also be settable by the user.

Figure 7:
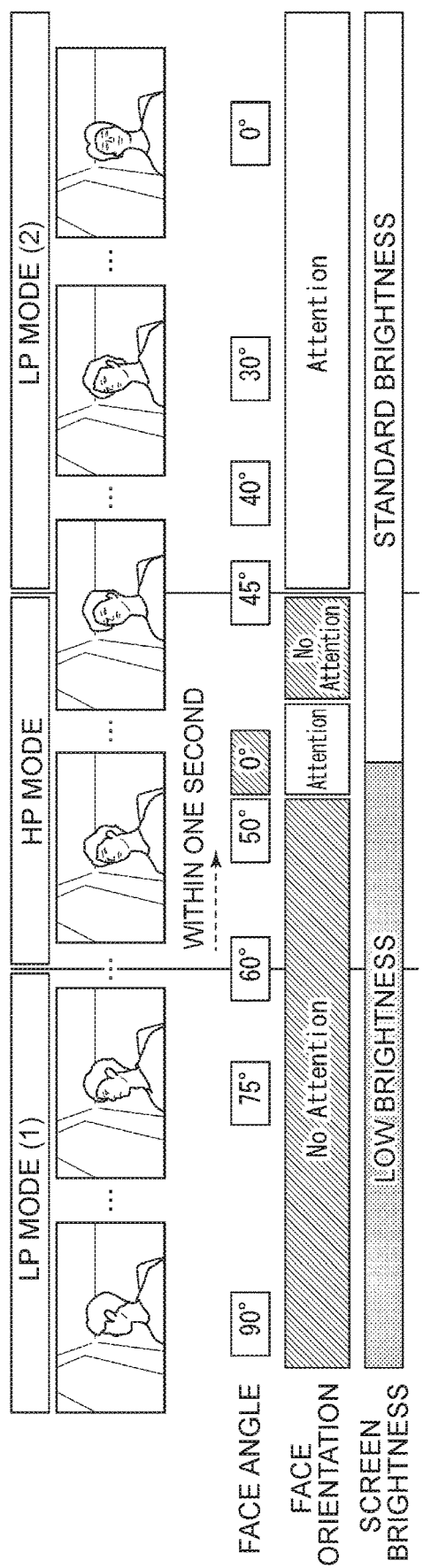
FIG. 7 is a schematic diagram illustrating an example of detection states by face detection processing and control states by screen brightness processing according to the embodiment.

Referring to FIG. 7, detection states by the face detection processing and control states by the screen brightness processing when the face orientation changes from sideways toward the front will be described.

FIG. 7 is a schematic diagram illustrating an example of detection states by the face detection processing and control states by the screen brightness processing according to the present embodiment. Here, since the face angle is processed in the same way regardless of positive or negative, the face angle will be denoted by an absolute value and described. For example, the absolute value of "±45" will be denoted as "45" and described.

While the detected face angle is in a range, for example, from 90° to 60°, the detection frame rate is controlled to the LP mode ("LP mode (1)" in FIG. 7). In this range, it is determined that the face is not facing forward ("No Attention"), and the screen brightness is being controlled to the low brightness. Then, when the face angle falls below 60°, the detection frame rate is switched from the LP mode ("LP mode (1)" in FIG. 7) to the HP mode to start the face direction determination processing. For example, when the face orientation changes from 60° to 50° (by 10° or more) within one second, it is determined that the face turns forward ("Attention") on the assumption that the face angle is 0°, and the screen brightness is controlled from the low brightness to the standard brightness. After that, during a period until the detected face angle becomes 45°, it is determined that the face is not facing forward ("No Attention") because the face angle is 45° or more. However, since the waiting time (for example, 10 seconds) is provided to switch from the standard brightness to the low brightness, the standard brightness is continued. When the detected face angle becomes less than 45°, since it is determined that the face is facing forward ("Attention"), the standard brightness is continued. In other words, the screen brightness is switched to the standard brightness before the face turns directly forward as the face orientation changes from sideways toward the front.

Further, when the detected face angle becomes less than 45°, the detection frame rate is switched from the HP mode to the LP mode ("LP mode (2)" in FIG. 7). Thus, when the screen brightness is the standard brightness and the face is facing forward ("Attention"), the detection frame rate is switched to the LP mode to reduce power consumption, while when the face direction determination processing is performed in the state where the screen brightness is being controlled to the low brightness, the detection frame rate is switched to the HP mode to restore the standard brightness immediately when the face turns forward ("Attention").

[Operation of Processing]

Figure 8:
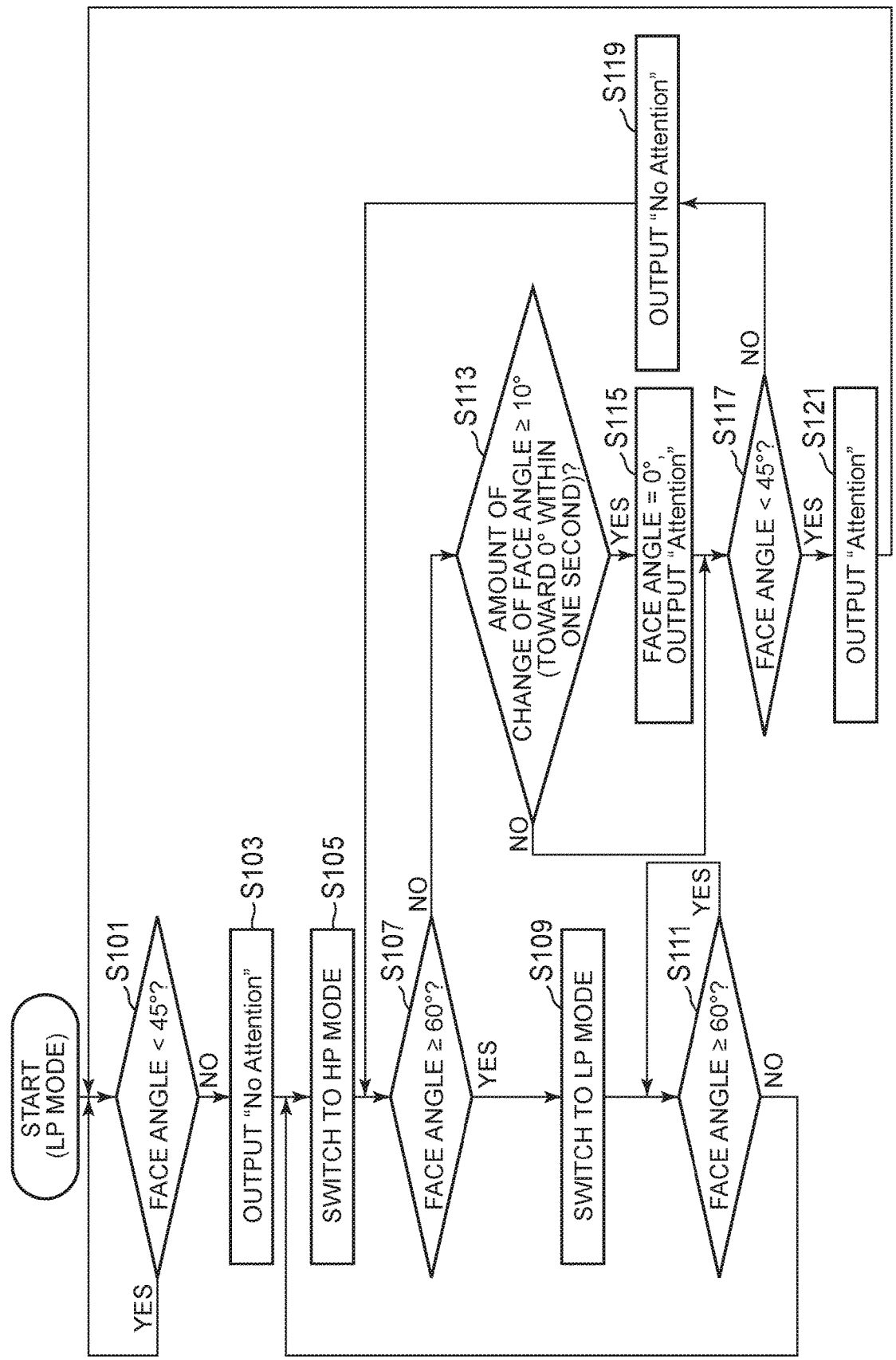
FIG. 8 is a flowchart illustrating an example of face detection processing according to the embodiment.

Next, the operation of face detection processing executed by the face detection unit 210 and screen brightness control processing executed by the system processing unit 310 will be described. Referring first to FIG. 8, the operation of face detection processing executed by the face detection unit 210 will be described.

FIG. 8 is a flowchart illustrating an example of face detection processing according to the present embodiment. Here, it is assumed that the information processing apparatus 1 is in such a state that the face of the user is facing forward in the normal operating state, and the face detection processing is being performed in the LP mode. Like the above description made with reference to FIG. 7, since the face angle is processed in the same way regardless of positive or negative, the face angle will be denoted by an absolute value and described. For example, the absolute value of "±45" will be denoted as "45°" and described.

(Step S101) In the LP mode, the face detection unit 210 detects the face angle based on the captured image acquired from the imaging unit 120, and determines whether or not the detected face angle is less than 45° (within the range of ±45°). When determining that the detected face angle is less than 45° (YES), the face detection unit 210 determines that the face is facing forward, and performs the process in step S101 again. On the other hand, when determining that the detected face angle is 45° or more (outside the range of ±45°) (NO), the face detection unit 210 proceeds to a process in step S103.

(Step S103) The face detection unit 210 determines that the face is not facing forward, outputs the "No Attention" information to the system processing unit 310, and proceeds to a process in step S105.

(Step S105) The face detection unit 210 switches from the LP mode to the HP mode, and detects the face angle based on the captured image acquired from the imaging unit 120 in the HP mode. Then, the face detection unit 210 proceeds to a process in step S107.

(Step S107) The face detection unit 210 determines whether or not the face angle detected in the HP mode is 60° or more (outside the range of ±60°). When determining that the detected face angle is 60° or more (YES), the face detection unit 210 proceeds to a process in step S109. On the other hand, when determining that the detected face angle is less than 60° (within the range of)+60° (NO), the face detection unit 210 proceeds to a process in step S113.

(Step S109) Since the face detection unit 210 does not perform the face direction determination processing when the face angle is 60° or more, the face detection unit 210 switches from the HP mode to the LP mode, and detects the face angle based on the captured image acquired from the imaging unit 120 in the LP mode. Then, the face detection unit 210 proceeds to a process in step S111.

(Step S111) The face detection unit 210 determines whether or not the face angle detected in the LP mode is 60° or more (outside the range of ±60°). When determining that the detected face angle is 60° or more (YES), the face detection unit 210 performs the process in step S111 again. On the other hand, when determining that the detected face angle is less than 60° (within the range of ±60°) (NO), the face detection unit 210 returns to the process in step S105 to switch from the LP mode to the HP mode.

(Step S113) The face detection unit 210 determines whether or not the amount of change of the face angle detected in the HP mode is a change of 10° or more toward the front (toward 0°) within one second. When determining that the face angle changes by 10° or more toward the front within one second (YES), the face detection unit 210 determines the face angle as if the face turned forward, sets the face angle to 0°, and outputs the "Attention" information to the system processing unit 310 (step S115). Then, the face detection unit 210 proceeds to a process in step S117.

On the other hand, when determining that the face angle does not change by 10° or more toward the front within one second (NO), the face detection unit 210 proceeds to the process in step S117 without performing the process in step S115.

(Step S117) The face detection unit 210 determines whether or not the face angle detected in the HP mode is less than 45° (within the range of ±45°). When determining that the detected face angle is 45° or more (outside the range of ±45°) (NO), the face detection unit 210 outputs the "No Attention" information to the system processing unit 310 (step S119), and returns to the process in step S107.

On the other hand, when determining that the detected face angle is less than 45° (within the range of ±45°) (YES), the face detection unit 210 determines that the face is facing forward, and outputs the "Attention" information to the system processing unit 310 (step S121).

Figure 9:
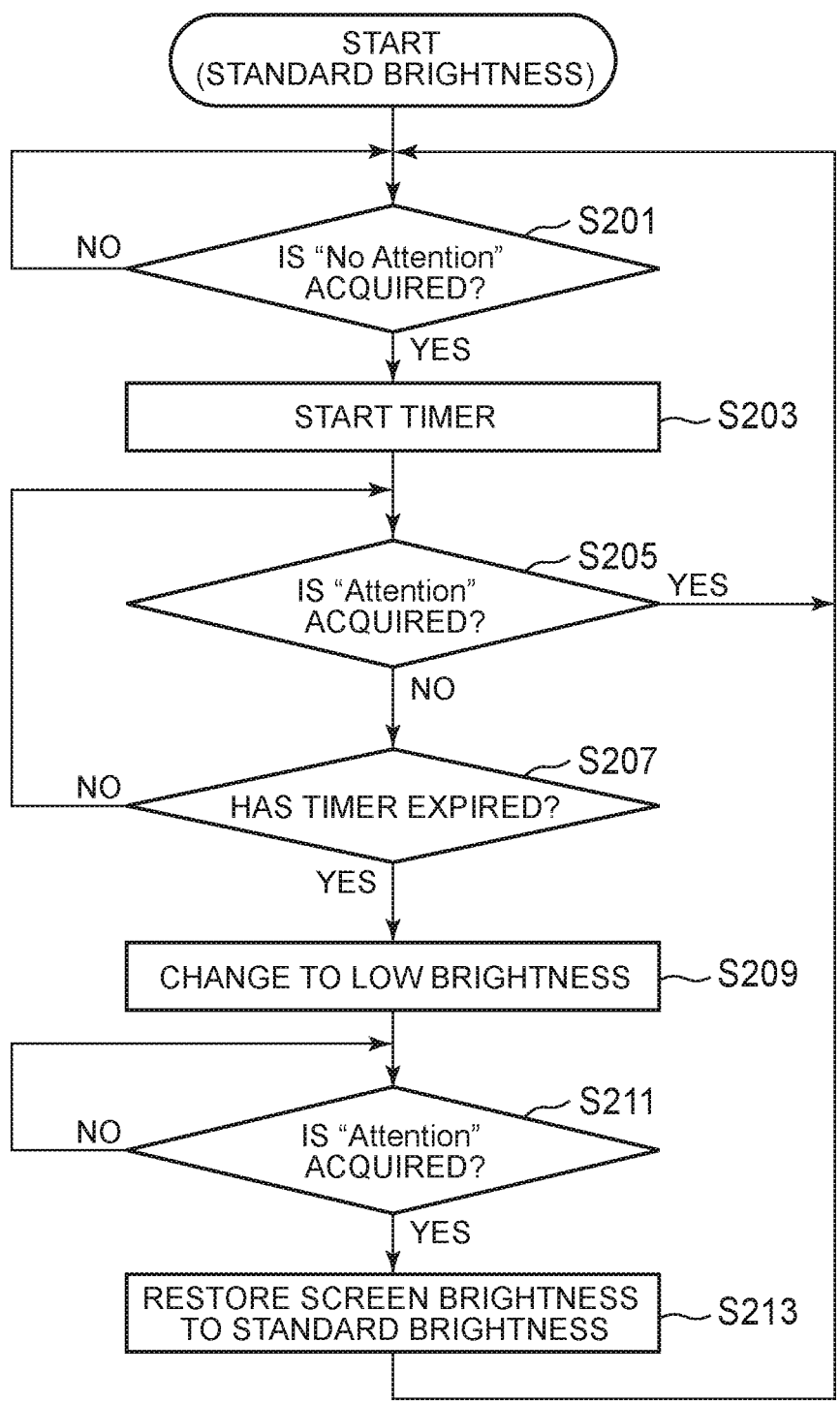
FIG. 9 is a flowchart illustrating an example of screen brightness control processing according to the embodiment.

Referring next to FIG. 9, the operation of screen brightness control processing executed by the system processing unit 310 will be described. FIG. 9 is a flowchart illustrating an example of screen brightness control processing according to the present embodiment. Here, it is assumed that the information processing apparatus 1 is in such a state that the face of the user is facing forward in the normal operating state and the screen brightness is being set to the standard brightness.

(Step S201) The screen brightness control unit 311 determines whether or not the "No Attention" information is acquired from the face detection unit 210. When determining that the "No Attention" information is not acquired (NO), the screen brightness control unit 311 performs the process in step S201 again. On the other hand, when determining that the "No Attention" information is acquired (YES), the screen brightness control unit 311 starts measuring the waiting time using the timer 312 (step S203). Then, the screen brightness control unit 311 proceeds to a process in step S205.

(Step S205) The screen brightness control unit 311 determines whether or not the "Attention" information is acquired from the face detection unit 210. When determining that the Attention" information is not acquired (NO), the screen brightness control unit 311 proceeds to a process in step S207.

(Step S207) The screen brightness control unit 311 determines whether or not the predetermined waiting time (for example, 10 seconds) has passed based on the value of the timer 312 (that is, whether or not the timer has expired). When determining that the predetermined waiting time (for example, 10 seconds) does not pass (that is, that the timer does not expire) (NO in step S207), the screen brightness control unit 311 returns to the process in step S205. When determining that the "Attention" information is acquired before the predetermined waiting time (for example, 10 seconds) passes (YES in step S205), the screen brightness control unit 311 returns to the process in step S201. At this time, the timer 312 is reset.

On the other hand, when determining in step S207 that the predetermined waiting time (for example, 10 seconds) has passed (YES in step S207), the screen brightness control unit 311 changes the screen brightness to the low brightness (step S209). Then, the screen brightness control unit 311 proceeds to a process in step S211.

(Step S211) The screen brightness control unit 311 determines whether or not the "Attention" information is acquired from the face detection unit 210. When determining that the "Attention" information is not acquired (NO), the screen brightness control unit 311 performs the process in step S211 again. On the other hand, when determining that the "Attention" information is acquired (YES), the screen brightness control unit 311 restores the screen brightness to the standard brightness (step S213).

Summary of Embodiment

As described above, the information processing apparatus 1 according to the present embodiment includes a memory (for example, the system memory 304) which temporarily stores image data of a captured image captured by the imaging unit 120. Further, the information processing apparatus 1 includes the face detection unit 210 and the CPU 301 as an example of processors. The face detection unit 210 processes the image data of the captured image stored in the memory mentioned above and executes face detection processing to detect a face area with a face captured therein and an orientation of the face from the captured image. Further, based on the orientation of the face detected by the above face detection processing, the CPU 301 executes brightness control processing to control the screen brightness of the display unit 110. Then, in the above face detection processing, when the detected face orientation falls within a preset first angle range (for example, the range of ±45°), the face detection unit 210 determines that the face orientation is forward (first orientation). Further, even when the detected face orientation is out of the first angle range (for example, the range of ±45°), the face detection unit 210 may determine that the face orientation is forward depending on the amount of change in the detected orientation of the face changing toward the front (in a direction of the first orientation).

Thus, when detecting the orientation of the face of the user to control the screen brightness of the display unit 110, since the information processing apparatus 1 detects that the face will turn forward before the face turns directly forward based on the fact that the face of the user changes toward the front, responsiveness when detecting the face orientation to control the screen brightness of the display unit 110 can be improved. This improvement in responsiveness can control the screen brightness positively depending on the face orientation, and hence can contribute to power saving.

For example, in the face detection processing, when the detected face orientation changes by a predetermined angle or more (for example, 10° or more) from sideways (an example of a second orientation) outside the first angle range (for example, the range of ±45°) toward the front within a predetermined time (for example, within one second) even though the detected face orientation is out of the first angle range (for example, the range of ±45°), the face detection unit 210 determines that the face orientation is forward (determines the face orientation as if the face turned forward).

Thus, the information processing apparatus 1 can detect that the face will turn forward before the face turns directly forward accurately according to the fact that the face orientation of the user changes from sideways toward the front.

Note that when the detected face orientation changes by the predetermined angle or more (for example, 10° or more) toward the front, it may not be determined whether or not the change occurs within the predetermined time (for example, within one second). For example, in the face detection processing, when the detected face orientation changes by the predetermined angle or more (for example, 10° or more) from the sideways (the example of the second orientation) outside the first angle range (for example, the range of ±45°) toward the front even though the detected face orientation is out of the first angle range (for example, the range of ±45°), the face detection unit 210 determines that the face orientation is forward (determines the face orientation as if the face turned forward).

Thus, the information processing apparatus 1 can detect that the face will turn forward before the face turns directly forward accurately according to the fact that the face orientation of the user changes from sideways toward the front.

Further, in the face detection processing, the face detection unit 210 performs the face direction determination processing within the second angle range (for example, the range of ±60°) wider than the first angle range (for example, the range of ±45°) to determine whether or not the face is facing forward (whether or not the face orientation is the first orientation). Then, the face detection unit 210 performs the face direction determination processing to determine whether or not the face is facing forward based on the amount of change of the detected face orientation toward the front outside the first angle range (for example, the range of ±45°) within the second angle range (for example, the range of ±60°).

Thus, the information processing apparatus 1 can detect that the face will turn forward before the face turns directly forward based on the amount of change toward the front even when the face is facing sideways.

Further, in the face detection processing, the face detection unit 210 reduces the detection frame rate (detection cycle) when the detected face orientation (for example, the face angle) is within the first angle range (for example, the range of ±45°) to less than the detection frame rate when the detected face orientation is out of the first angle range.

Thus, the information processing apparatus 1 can suppress an increase in power consumption when the user is using the information processing apparatus 1 (when the face of the user is facing forward), and in the case where the screen brightness is the low brightness (in the case where the face of the user is facing sideways), the information processing apparatus 1 can increase the detection speed of the face orientation to speed up switching to the standard brightness when the face turns forward.

For example, in the face detection processing, the face detection unit 210 reduces the detection frame rate (detection cycle) when the detected face orientation (for example, face angle) is within the first angle range (for example, the range of ±45°) to less than the detection frame rate when the face orientation is out of the first angle range within the second angle range (for example, the range of ±60°).

Thus, the information processing apparatus 1 can suppress an increase in power consumption when the user is using the information processing apparatus 1 (when the face of the user is facing forward), or conversely when the user is unlikely to turn forward like in a state where the user is facing directly sideways or backward, the information processing apparatus 1 can suppress the increase in power consumption, and at such a face angle that the user is likely to turn forward (at a face angle close to the front), the information processing apparatus 1 can increase the detection speed of the face orientation to speed up switching to the standard brightness when the face turns forward.

Further, in the brightness control processing, when the face orientation (for example, face angle) detected by the face detection unit 210 changes from within the first angle range (for example, the range of ±45°) to outside the first angle range, the CPU 301 reduces the screen brightness to the low brightness.

Thus, when the user is not using the information processing apparatus 1 (when the user is facing sideways), the information processing apparatus 1 can suppress power consumption by controlling, to the low brightness, the screen brightness of the display unit 110 that the user is not looking at.

Further, when it is determined that the face orientation detected by the face detection unit 210 is forward (first orientation) in the state where the screen brightness is being reduced to the low brightness in the brightness control processing, the CPU 301 restores the screen brightness to that before being reduced (to the standard brightness).

Thus, the information processing apparatus 1 can make the display of the display unit 110 visible when the user uses the information processing apparatus 1 (when the face of the user turns forward).

Further, the imaging unit 120 outputs image data of an image captured by imaging the detection range FoV (a predetermined angle of view) in a direction to face the screen of the display unit 110.

Thus, the information processing apparatus 1 can properly detect the orientation of the face of the user who is using the information processing apparatus 1.

Further, a control method for the information processing apparatus 1 according to the present embodiment includes: a face detection step of causing the face detection unit 210 to process image data of a captured image captured by the imaging unit 120 and temporarily stored in a memory (for example, the system memory 304) in order to detect a face area with a face captured therein and an orientation of the face from the captured image; and a brightness control step of causing the CPU 301 to control the screen brightness of the display unit 110 based on the orientation of the face detected in the face detection step. Further, in the face detection step, when the detected face orientation falls within the preset first angle range (for example, the range of ±45°), the face detection unit 210 determines that the face orientation is forward (first orientation), and even when the detected face orientation is out of the first angle range (for example, the range of ±45°), the face detection unit 210 determines that the face orientation is toward the front depending on the amount of change in the detected orientation of the face changing toward the front (in a direction of the first orientation).

Thus, when detecting the orientation of the face of the user to control the screen brightness of the display unit 110, since the information processing apparatus 1 detects that the face will turn forward before the face turns directly forward based on the fact that the orientation of the face of the user changes toward the front, responsiveness when detecting the face orientation to control the screen brightness of the display unit 110 can be improved. This improvement in responsiveness can control the screen brightness (for example, can reduce the screen brightness) positively depending on the face orientation, and hence can contribute to power saving.

While the embodiment of this invention has been described in detail above with reference to the accompanying drawings, the specific configurations are not limited to those in the embodiment described above, and design changes are also included without departing from the scope of this invention. For example, the respective components described in the above embodiment can be combined arbitrarily.

Further, in the aforementioned embodiment, the configuration example in which the imaging unit 120 is built in the information processing apparatus 1 is described, but the present invention is not limited to this example. For example, the imaging unit 120 does not have to be built in the information processing apparatus 1, which may also be attachable to the information processing apparatus 1 (for example, onto any of the side faces 10a, 10b, 10c, and the like) and communicably connected to the information processing apparatus 1 wirelessly or by wire as an external accessory of the information processing apparatus 1.

Further, the CPU 301 and the chipset 303 may be configured as individual processors, or may be integrated as one processor.

Further, in the aforementioned embodiment, the example in which the face detection unit 210 is provided separately from the CPU 301 and the chipset 303 is illustrated, but some or all of the functions of the face detection unit 210 may be provided by the chipset 303, or provided by a processor integrated with the CPU 301 or the chipset 303. For example, the CPU 301, the chipset 303, and the face detection unit 210 may be configured as individual processors, or may be integrated as one processor. Further, some or all of the functions of the face detection unit 210 may be provided by the EC 200.

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Note that the standby state, the sleep state, the hibernation state, the power-off state, and the like as the standby state are states lower in power consumption than the normal operating state (states of reducing power consumption).

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 1 in the above-described embodiment may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the information processing apparatus 1 of the aforementioned embodiment is not limited to the laptop PC, which may also be a desktop PC or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 1 information processing apparatus
10 first chassis
20 second chassis
15 hinge mechanism
110 display unit
120 imaging unit
140 power button
150 input device
151 keyboard
153 touch pad
160 communication unit
170 storage unit
200 EC
210 face detection unit
211 face area detection unit
212 face angle detection unit
213 face direction determination unit
214 detection cycle control unit
300 main processing unit
301 CPU
302 GPU
303 chipset
304 system memory
310 system processing unit
311 screen brightness control unit
312 timer
400 power supply unit

What is claimed is:

1. An information processing apparatus comprising:
a memory that stores image data of an image captured by an imaging unit; and
a processor that:
processes the image data stored in the memory to detect a face orientation of a face captured in the image data, and
controls a screen brightness of a display unit based on the face orientation, wherein
the processor sets the screen brightness to a first brightness upon detecting that the face orientation is within a first angle range with respect to the imaging unit, wherein
the first angle range is defined by a first angle threshold and covers a range from zero degree to a predetermine plus or minus angle, and
the zero degree is defined as the face orientation facing a predetermined direction based on a location of the imaging unit,
the processor sets the screen brightness to a second brightness upon detecting that the face orientation is out of the first angle range, wherein
the second brightness is lower than the first brightness, and
the processor sets the screen brightness to the first brightness, regardless of whether face orientation is within the first angle range, upon detecting that the face orientation changes from a first angle to a second angle within a predetermined time period, wherein
the second angle is closer to the first angle threshold than is the first angle.

2. The information processing apparatus according to claim 1, wherein upon detecting that the face orientation changes by a predetermined angle or more from the face orientation out of the first angle range toward the face orientation within the first angle range, the processor determines that the face orientation is within the first angle range even though the face orientation is being out of the first angle range.

3. The information processing apparatus according to claim 2, wherein upon detecting that the face orientation changes by the predetermined angle or more from the face orientation out of the first angle range toward the first orientation within the first angle range, within a predetermined time, the processor determines that the face orientation is within the first angle range even though the face orientation is being out of the first angle range.

4. The information processing apparatus according to claim 1, wherein the processor determines, out of the first angle range, within a second angle range wider than the first angle range, whether the face orientation is within the first angle range based on an amount of change of the face orientation toward the face orientation within the first angle range.

5. The information processing apparatus according to claim 4, wherein
the processor reduces a detection cycle in case of detecting the face orientation within the first angle range to less than a detection cycle in case of detecting the face orientation out of the first angle range but within the second angle range.

6. The information processing apparatus according to claim 1, wherein upon detecting that the face orientation changes from within the first angle range to out of the first angle range, the processor reduces the screen brightness.

7. The information processing apparatus according to claim 1, wherein upon determining that the face orientation is within the first angle range in such a state that the screen brightness is reduced, the processor restores the screen brightness before being reduced.

8. The information processing apparatus according to claim 1, wherein the imaging unit outputs the image data of the image obtained by imaging a predetermined angle of view in a direction to face a screen of the display unit.

9. A control method for an information processing apparatus including: a memory that stores image data of an image captured by an imaging unit; and a processor that processes the image data stored in the memory, the control method comprising:

processing the image data stored in the memory to detect a face orientation of a face captured in the image data; and controlling a screen brightness of a display unit based on the face orientation, wherein the controlling includes:

setting the screen brightness to a first brightness upon detecting that the face orientation is within a first angle range with respect to the imaging unit, wherein
the first angle range is defined by a first angle threshold and covers a range from zero degree to a predetermine plus or minus angle, and
the zero degree is defined as the face orientation facing a predetermined direction based on a location of the imaging unit;

setting the screen brightness to a second brightness upon detecting that the face orientation is out of the first angle range, wherein
the second brightness is lower than the first brightness; and setting the screen brightness to the first brightness, regardless of whether the face orientation is within the first angle range, upon detecting that the face orientation changes from a first angle to a second angle within a predetermined time period, wherein the second angle is closer to the first angle threshold than is the first angle.

* * * * *